US010254445B2

United States Patent
Khan et al.

(10) Patent No.: US 10,254,445 B2
(45) Date of Patent: Apr. 9, 2019

(54) DIAMOND COATED ANTIREFLECTIVE WINDOW SYSTEM AND METHOD

(71) Applicants: Adam Khan, San Francisco, CA (US); Robert Polak, Lindenhurst, IL (US)

(72) Inventors: Adam Khan, San Francisco, CA (US); Robert Polak, Lindenhurst, IL (US)

(*) Notice: Subject to any disclaimer, the term of this patent is extended or adjusted under 35 U.S.C. 154(b) by 195 days.

(21) Appl. No.: 15/461,371

(22) Filed: Mar. 16, 2017

(65) Prior Publication Data

US 2017/0269263 A1    Sep. 21, 2017

Related U.S. Application Data

(60) Provisional application No. 62/309,444, filed on Mar. 16, 2016.

(51) Int. Cl.
| | |
|---|---|
| *G02B 1/115* | (2015.01) |
| *C23C 16/27* | (2006.01) |
| *C23C 14/10* | (2006.01) |
| *G02B 1/14* | (2015.01) |
| *G02B 1/11* | (2015.01) |
| *C23C 14/35* | (2006.01) |
| *G02B 1/18* | (2015.01) |
| *G02B 1/113* | (2015.01) |

(52) U.S. Cl.
CPC ............... *G02B 1/115* (2013.01); *G02B 1/11* (2013.01); *G02B 1/113* (2013.01); *G02B 1/14* (2015.01); *G02B 1/18* (2015.01)

(58) Field of Classification Search
CPC .......... G02B 1/11; G02B 1/113; G02B 1/115; G02B 1/14; G02B 1/18
USPC .......................................................... 359/359
See application file for complete search history.

(56) References Cited

U.S. PATENT DOCUMENTS

| | | | | |
|---|---|---|---|---|
| 4,907,846 | A * | 3/1990 | Tustison | G02B 1/105 359/359 |
| 5,425,983 | A * | 6/1995 | Propst | G02B 1/115 428/212 |
| 5,472,787 | A * | 12/1995 | Johnson | C23C 14/024 359/359 |
| 5,643,423 | A * | 7/1997 | Kimock | B32B 17/06 204/192.35 |
| 2002/0191268 | A1 * | 12/2002 | Seeser | G02B 6/29358 359/260 |
| 2014/0342122 | A1 * | 11/2014 | Inglis | C23C 16/01 428/141 |

* cited by examiner

*Primary Examiner* — William R Alexander
*Assistant Examiner* — Ephrem Z Mebrahtu
(74) *Attorney, Agent, or Firm* — Lawrence E. Thompson

(57) ABSTRACT

A system and method for diamond based multilayer antireflective coating for optical windows are provided. An antireflective coatings for optical windows may include an optical grade silicon substrate; a plurality of polycrystalline diamond films, a plurality of germanium films, and a plurality of fused silica films. A method of fabricating a diamond based multilayer antireflective coating may include the steps of cleaning and seeding an optical substrate, forming a plurality of diamond layers above the optical substrate, forming a plurality of germanium layers above the optical substrate; and forming a plurality of fused silica layers above the optical substrate, wherein the reflectance of the antireflective coating is between 0.1 and 3.0 percent for infrared spectrum wavelengths between 1800 and 5000 nanometers.

7 Claims, 2 Drawing Sheets

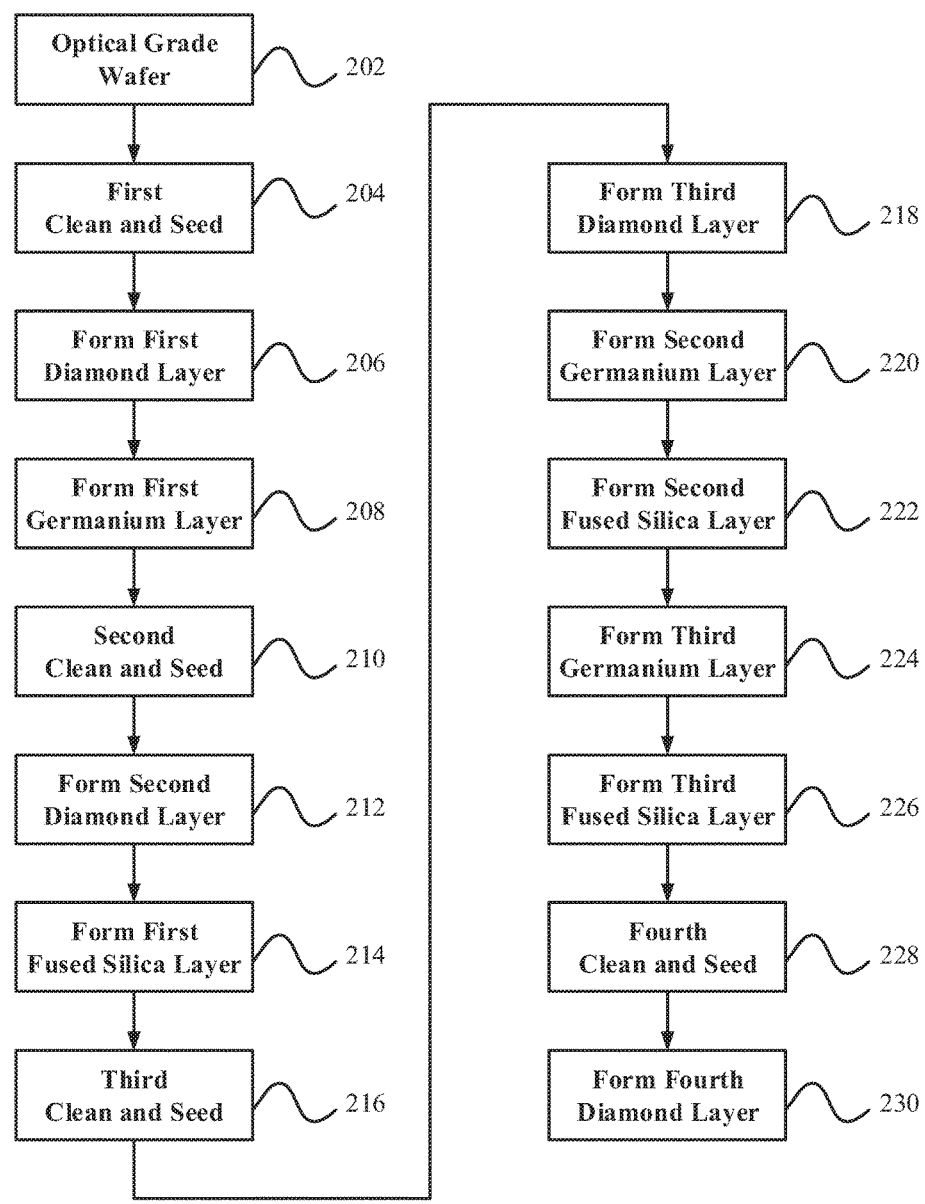

DIAMOND COATED ANTIREFLECTIVE WINDOW SYSTEM AND METHOD

CROSS-REFERENCE TO RELATED APPLICATION

This application claims the benefit of U.S. Provisional Application No. 62/309,444, filed Mar. 16, 2016, which is fully incorporated herein by reference.

BACKGROUND

Field

This invention is generally related to systems and methods for antireflective coatings for optical windows, and more particularly to a system and method for providing diamond based multilayer antireflective coating for optical windows.

Background

Diamond possesses favorable theoretical semiconductor performance characteristics, including the possibility of creating transparent electronics, including those related to optical windows. However, practical diamond based semiconductor device applications for optical windows remain limited.

SUMMARY

Disclosed herein is a new and improved system and method for diamond based multilayer antireflective coating for optical windows. In accordance with one aspect of the approach, a system for antireflective coatings for optical windows may include an optical grade silicon substrate, a first polycrystalline diamond film on the silicon substrate; a first germanium film on the first polycrystalline diamond film, a second polycrystalline diamond film on the first germanium film, a first fused silica film on the second polycrystalline diamond film; a third polycrystalline diamond film on the first fused silica film, a second germanium film on the third polycrystalline diamond film, a second fused silica film on the second germanium film, a third germanium film on the second fused silica film, a third fused silica film on the third germanium film, and a fourth polycrystalline diamond film on the third fused silica film.

In another approach, a method of fabricating a transparent electronic device, may include the steps of cleaning and seeding an optical substrate, forming a plurality of diamond layers above the optical substrate, forming a plurality of germanium layers above the optical substrate; and forming a plurality of fused silica layers above the optical substrate, wherein the reflectance of the antireflective coating is between 0.1 and 3.0 percent for infrared spectrum wavelengths between 1800 and 5000 nanometers.

Other systems, methods, aspects, features, embodiments and advantages of the system and method disclosed herein will be, or will become, apparent to one having ordinary skill in the art upon examination of the following drawings and detailed description, it is intended that all such additional systems, methods, aspects, features, embodiments and advantages be included within this description, and be within the scope of the accompanying claims,

BRIEF DESCRIPTION OF THE DRAWINGS

It is to be understood that the drawings are solely for purpose of illustration. Furthermore, the components in the figures are not necessarily to scale, emphasis instead being placed upon illustrating the principles of the system disclosed herein. In the figures, like reference numerals designate corresponding parts throughout the different views.

FIG. 2 a block diagram of an embodiment of a method for fabricating a monolithically integrated antireflective coating film structure, such as the structure of FIG. 1.

DETAILED DESCRIPTION

Figure 1:
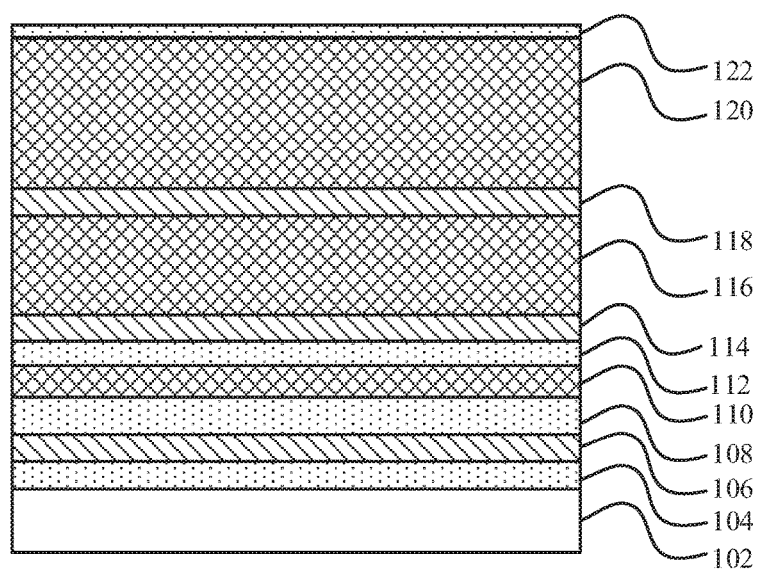
FIG. 1 is schematic diagram of an exemplary monolithically integrated antireflective coating film structure.

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

Prior medium wavelength infrared antireflective coatings may suffer from delamination, degradation, and fluctuating optical transmissivity. Nanocrystalline diamond may provide high transmissivity infrared windows with high reliability. Semiconductor grade nanocrystalline diamond material is effective in optical display applications, particularly in tandem with fused silica films. Multilayer film synthesis provides nanocrystalline diamond based antireflective coatings fabrication which is beneficial for use in medium wavelength infrared applications, for example in wavelength applications from 1.5 micrometers to 5.6 micrometers.

Single layer antireflective coatings may minimize the reflectance, but may reduce it to zero only for a certain value of film refractive index. A multi-layer antireflective coating deposited on a substrate may reduce the reflectance from the substrate to zero for a certain wavelength range. Optical grade silicon may have an index of refraction (n) of approximately 3.4. Lower value index of refraction diamond (n=2.4) may be incorporated with optical materials of higher and lower indices of refraction, such as germanium (n=4.0) and fused silica (n=1.4), respectfully, to produce near zero reflectance at infrared wavelengths for certain values of film thicknesses. Utilizing optical design programs, such as open-source software for the design, optimization, and synthesis of optical filters, for example, Openfilters, with inputs optimized for the medium wavelength infrared range, high transmittance at a variety of critical angels may be realized via a multi-layer antireflective coating consisting of an optical substrate Silicon, a number of antireflective coating film layers of nanocrystalline diamond, a number of antireflective coating film layers of germanium, and a number of antireflective coating film layers of fused silica. The layers being of varying thicknesses. Further, utilizing this modality, the hydrophobicity and scratch resistance of diamond may enhance the performance of connecting fused silica layer, as water accumulation is known to cause absorption of light in fused silica systems.

Diamond layers may provide advantages such as ultra-hardness, scratch-resistance, high thermal conductivity, hydrophobicity, chemical and biological inertness, amongst others. In part, due to difficulty in fabricating high quality films cost efficiently, diamond has traditionally not been used for infrared optical window applications due to diamond's sharp and semi-sharp absorption spectra in the medium wavelength infrared region. However, through novel multilayer combinations with optical materials of larger and smaller refractive index values, it is now possible to capture the favorable material properties of diamond in antireflective coatings for medium wavelength infrared optical window applications. The disclosed systems may provide a more rugged system for various applications, such as for battlefield applications. This disclosure provides several preferred embodiments of fabrication, however, the performance characteristics and materials characteristics described in this application are not necessarily performance bounds or limitations of the invention. These disclosures merely demonstrate some aspects of the invention that have presently been tested.

FIG. 1 shows a schematic diagram of an exemplary monolithically integrated antireflective coating film structure 100. Structure 100 may include a substrate 102, a first diamond film 104, a first germanium film 106, a second diamond film 108, a first fused silica film 110, a third diamond film 112, a second germanium 114, a second fused silica film 116, a third germanium film 118, a third fused silica film 120, and a fourth diamond film 122. Substrate 102 may be an optical grade substrate, such as, but not limited to an optical grade silicon substrate. Diamond films 104, 108, 112 and 122 may be polycrystalline diamond films. Film structure 100 is shown as an exemplary composite film structure and exemplary sequence for a diamond based multilayer antireflective coating for infrared optical windows.

Although various embodiments may include varying thickness layers, in one embodiment, the thickness of the layers may be as follows:
the first diamond film 104 may be 63 nanometers;
the first germanium film 106 may be 60 nanometers;
the second diamond film 108 may be 83 nanometers;
the first fused silica film 110 may be 50 nanometers;
the third diamond film 112 may be 25 nanometers;
the second germanium film 114 may he 54 nanometers;
the second fused silica film 116 may be 215 nanometers;
the third germanium film 118 may be 28 nanometers;
the third fused silica film 120 may be 477 nanometers; and
the fourth diamond film 122 may be 10 nanometers.
In another embodiment, the thickness of the layers may vary by plus or minus 10 percent of the thicknesses provided immediately above. In another embodiment, the thickness of the layers may vary by plus or minus 5 percent of the thicknesses provided immediately above. Embodiments, may provide reflectance values such as shown below:

| Wavelength | Reflectance of Randomly Polarized Light |
|---|---|
| 1.8-2.5 μm | 0.1-2.5% |
| 3.0-3.5 μm | 0.1-2.1% |
| 3.5-4.1 μm | 0.1-1.3% |
| 4.4-4.75 μm | 0.1-2.1% |
| 4.75-5.0 μm | 0.1-3.0% |

FIG. 2 shows a block diagram of an embodiment of a method 200 for fabricating a diamond based multilayer antireflective coating, such as exemplary monolithically integrated antireflective coating film structure 100. Fabrication of such a system can he realized utilizing a combination of techniques, such as, chemical vapor deposition, physical vapor deposition, and reactive ion etching systems.

Method 200 may include a first step 202 of selecting an optical substrate, such as an optical grade silicon wafer, for example, substrate 102. Method 200 may include a second step 204 of a first cleaning and seeding of the optical grade silicon wafer of first step 202. For example, step 204 may include exposing the optical grade silicon wafer to an acid cleaning mixture, such as (4:1 $H_2SO_4/H_2O_2$, $H_2O_2$, 5:1:1 $H_2O/H_2O_2/HCl$) and a buffered oxide etch, to remove surface contaminants and oxides. Step 204 may also include subjecting the prior layer to an alcohol based ultrasonic cleaning. Step 204 may also include seeding the optical grade silicon wafer with a nanoseed solution mixture and ultrasoniced in alcohol solution to promote nucleation and film agglomeration.

Method 200 may include a step 206 of forming a first diamond layer, for example, first diamond lay 102. Step 206 may include chemical vapor deposition growth and etching of the diamond layer. Step 206 may include exposing the wafer of step 204 to a methane, argonne, and hydrogen plasma gas mixture in a pressurized chemical vapor deposition system to produce the a nanocrystalline diamond film, for example, the first diamond film 104, in on the order of hundreds of nanometers per hour. The chemical vapor deposition may be a complementary metal oxide semiconductor chemical vapor deposition. The chemical vapor deposition may include the use of microwave plasma chemical vapor deposition and thermally activated chemical vapor deposition. In the event the diamond growth is beyond the target thickness, reactive ion etching via an argonne and oxygen mixture and/or ion milling may produce bulk planarized uniform diamond films.

Method 200 may include a step 208 of forming a first germanium layer. Step 208 may include sputtering physical vapor deposition and etching. Step 208 may include high purity germanium targets loaded into a magnetron sputtering physical vapor deposition system to produce germanium film, such as, for example, first germanium film 106. Step 208 may include pumping the sputtering chamber down to achieve a target base pressure where germanium targets have been loaded into DC guns. Step 208 may include sputtering germanium ions onto the prior layer, for example, first diamond film 104, under an Argonne plasma. Step 208 may also include rapid thermal processing between 643 K and 673 K at a ramp rate, such as, 50 K/s. Step 208 may include ion milling in the event the germanium growth is beyond the desired thickness.

Method 200 may include a step 210 of a second cleaning and seeding, for example, cleaning and seeding a germanium layer. Method 200 may include a step 212 of forming a second diamond layer, for example, forming the second diamond film 108. Step 212 may include processes similar to those used in step 206.

Method 200 may include a step 214 of forming a first fused silica film, for example, first fused silica film 110. Step 214 may include sputtering physical vapor deposition and etching. Step 210 may include a high purity fused silica target loaded into a sputtering physical vapor deposition system to produce fused silica films using RF guns. Step 214 may include sputtering under flowing Argonne and oxygen gas. Step 214 may also include ion milling in the event of fused silica growth is beyond the desired thickness.

Method 200 may include a step 216 of a third cleaning and seeding, for example, cleaning and seeding a silica layer, for example, first fused silica film 110. Method 200 may include a step 218 of forming a third diamond layer, for example, forming the third diamond film 112. Step 212 may include processes similar to those used in step 206.

Method 200 may include a step 220 of forming a second germanium layer. Step 220 may include processes similar to those used in step 208. Method 200 may include a step 222 of forming a second fused silica film. Step 222 may include processes similar to those used in step 214.

Method 200 may include a step 224 of forming a third germanium layer. Step 224 may include processes similar to those used in step 208. Method 200 may include a step 226 of forming a third fused silica film, Step 226 may include processes similar to those used in step 214.

Method 200 may include a step 228 of a fourth cleaning and seeding, for example, cleaning and seeding a silica layer, for example, third fused silica film 120. Method 200 may include a step 230 of forming a fourth diamond layer, for example, forming the fourth diamond film 122. Step 230 may include processes similar to those used in step 206.

The commercially available optics design software suite, Open Filters, may be utilized to simulate the transmittance of the proposed system. Embodiments of the system and method were shown to have beneficial transmissivity in the infrared spectrum ranges between 3700 nanometers and 4900 nanometers in wavelength with transmittance shown to be in excess of 94% at critical incident angles of 0°, 15°, 30°, and 45°.

Structure 100 and method 200 may incorporate systems and methods previously disclosed and described in U.S. Patent Publication No. 2013/0026492, by Adam Khan, published on Jan. 31, 2013, U.S. Pat. No. 8,354,290, issued to Anirudha Summit, et al, on Jan. 15, 2013; U.S. Pat. No. 8,933,462, issued to Adam Khan on Jan. 13, 2015; U.S. Patent Publication No. 2015/0206749, by Adam Khan, published on Jul. 23, 2015, and U.S. Patent Publication No. 2015/0295134, by Adam Khan, et al, published on Oct. 15, 2015, all of which are fully incorporated herein by reference.

The word "exemplary" is used herein to mean "serving as an example, instance, or illustration." Any embodiment or variant described herein as "exemplary" is not necessarily to be construed as preferred or advantageous over other embodiments or variants. All of the embodiments and variants described in this description are exemplary embodiments and variants provided to enable persons skilled in the art to make and use the invention, and not necessarily to limit the scope of legal protection afforded the appended claims.

The above description of the disclosed embodiments is provided to enable any person skilled in the art to make or use that which is defined by the appended claims. The following claims are not intended to be limited to the disclosed embodiments. Other embodiments and modifications will readily occur to those of ordinary skill in the art in view of these teachings. Therefore, the following claims are intended to cover all such embodiments and modifications when viewed in conjunction with the above specification and accompanying drawings.

We claim:

1. An antireflective coating for optical windows, comprising:
   an optical grade silicon substrate;
   a first polycrystalline diamond film on the silicon substrate;
   a first germanium film on the first polycrystalline diamond film;
   a second polycrystalline diamond film on the first germanium film;
   a first fused silica film on the second polycrystalline diamond film;
   a third polycrystalline diamond film on the first fused silica film;
   a second germanium film on the third polycrystalline diamond film;
   a second fused silica film on the second germanium film;
   a third germanium film on the second fused silica film;
   a third fused silica film on the third germanium film; and
   a fourth polycrystalline diamond film on the third fused silica film.

2. The antireflective coating of claim 1, where the first polycrystalline diamond film is between 57 and 69 nanometers, the first germanium film is between 54 and 66 nanometers; a second polycrystalline diamond film is between 75 and 91 nanometers, the first fused silica film is between 45 and 55 nanometers; the third polycrystalline diamond film is between 23 and 27 nanometers; the second germanium film is between 50 and 58 nanometers; the second fused silica film is between 195 and 235 nanometers; the third germanium film is between 26 and 30 nanometers; the third fused silica film is between 430 and 524 nanometers; and the fourth polycrystalline diamond film is between 9 and 11 nanometers.

3. The antireflective coating of claim 1, wherein for infrared spectrum wavelengths between 1800 and 5000 nanometers the reflectance is between 0.1 and 3.0 percent.

4. A method of fabricating a diamond based multilayer antireflective coating, the method including the steps of:
   cleaning and seeding an optical substrate;
   forming a plurality of diamond layers above the optical substrate;
   forming a plurality of germanium layers above the optical substrate; and
   forming a plurality of fused silica layers above the optical substrate;
   wherein the reflectance of the antireflective coating is between 0.1 and 3.0 percent for infrared spectrum wavelengths between 1800 and 5000 nanometers.

5. The method of claim 4, wherein the optical substrate is an optical grade silicon substrate.

6. The method of claim 4, wherein forming the first diamond layer includes a chemical vapor deposition.

7. The method of claim 4, wherein forming the germanium layer includes a sputtering physical vapor deposition.

* * * * *